United States Patent
Alvarez Callau et al.

(10) Patent No.: US 10,873,541 B2
(45) Date of Patent: Dec. 22, 2020

(54) SYSTEMS AND METHODS FOR PROACTIVELY AND REACTIVELY ALLOCATING RESOURCES IN CLOUD-BASED NETWORKS

(71) Applicant: Microsoft Technology Licensing, LLC, Redmond, WA (US)

(72) Inventors: Oscar Edwin Alvarez Callau, Bellevue, WA (US); Lukasz Zaluski, Redmond, WA (US); Aleksei Polkovnikov, Friedrichsdorf (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 385 days.

(21) Appl. No.: 15/489,240

(22) Filed: Apr. 17, 2017

(65) Prior Publication Data
US 2018/0302340 A1 Oct. 18, 2018

(51) Int. Cl.
*H04L 12/911* (2013.01)
*H04L 12/917* (2013.01)
(Continued)

(52) U.S. Cl.
CPC .......... *H04L 47/823* (2013.01); *G06F 9/5061* (2013.01); *G06F 9/5072* (2013.01);
(Continued)

(58) Field of Classification Search
CPC .............................................. G06F 2209/5019
See application file for complete search history.

(56) References Cited

U.S. PATENT DOCUMENTS 9,128,899 B1 * 9/2015 McAlister ............. G06F 11/203
9,218,207 B1 12/2015 Neuse et al.
(Continued)

FOREIGN PATENT DOCUMENTS

CN 102307241 A 1/2012
CN 103067388 A 4/2013
(Continued)

OTHER PUBLICATIONS

Bouabdallah, et al., "Use of Reactive and Proactive Elasticity to Adjust Resources Provisioning in the Cloud Provider", In Proceedings of 18th International Conference on High Performance Computing and Communications, Dec. 12, 2016, pp. 1155-1162.
(Continued)

*Primary Examiner* — Chris Parry
*Assistant Examiner* — Abderrahmen Chouat
(74) *Attorney, Agent, or Firm* — Ray Quinney & Nebeker, P.C.; Thomas M. Hardman; Timothy J. Churna

(57) ABSTRACT

A resource allocation system is provided and includes a processor, a memory, and an application including instructions configured to: receive forecast data from a forecast server computer indicating a predicted metric value corresponding to a cloud-based service for a first geographical region; determine an expected usage amount for the first geographical region based on the predicted metric value; determine a failover resource amount to cover a portion of a load in a second geographical region due to a failure; determine a predicted resource allocation value based on the expected usage and failover resource amounts; determine a reactive resource allocation value based on the predicted metric value or a parameter, where the parameter corresponds to access of cloud-based resources for the cloud-based service; prioritize the predicted and reactive resource allocation values; and adjust a resource allocation amount
(Continued)

for the first geographical region over time based on a result of the prioritization.

22 Claims, 11 Drawing Sheets

(51) Int. Cl.
 *H04L 29/08* (2006.01)
 *G06F 9/50* (2006.01)
(52) U.S. Cl.
 CPC .......... *H04L 47/76* (2013.01); *H04L 47/821* (2013.01); *H04L 67/10* (2013.01); *G06F 2209/5019* (2013.01)

(56) References Cited

U.S. PATENT DOCUMENTS

| | | | |
|---|---|---|---|
| 9,329,904 | B2 | 5/2016 | Wray et al. |
| 9,356,883 | B1 | 5/2016 | Borthakur |
| 2005/0120111 | A1* | 6/2005 | Bailey ................. G06F 11/3409 709/224 |
| 2010/0306767 | A1 | 12/2010 | Dehaan |
| 2012/0173709 | A1 | 7/2012 | Li et al. |
| 2012/0324092 | A1 | 12/2012 | Brown et al. |
| 2013/0080617 | A1* | 3/2013 | Driesen ............... H04L 43/0876 709/224 |
| 2014/0059379 | A1 | 2/2014 | Ren et al. |
| 2014/0282591 | A1* | 9/2014 | Stich .................... G06F 9/5061 718/104 |
| 2017/0149687 | A1* | 5/2017 | Udupi ................. H04L 67/1002 |
| 2017/0318083 | A1* | 11/2017 | Ignatyev ............... H04L 67/306 |

FOREIGN PATENT DOCUMENTS

| | | |
|---|---|---|
| CN | 103118124 A | 5/2013 |
| CN | 104270418 A | 1/2015 |

OTHER PUBLICATIONS

Larsson, Lars, "Advanced predictive and proactive auto scaling", https://www.citycloud.com/autoscaling/advanced-predictive-and-proactive-auto-scaling/, Published on: Oct. 13, 2015, 6 pages.

Chao, et al., "Multi-agent-based cloud utilization for the IT office-aid asset distribution chain: An empirical case study", In Journal of Information Sciences, vol. 245, Oct. 1, 2013, 2 pages.

"International Search Report and Written Opinion Issued in PCT Application No. PCT/US2018/026159", dated Jul. 2, 2018, 12 Pages.

* cited by examiner

SYSTEMS AND METHODS FOR PROACTIVELY AND REACTIVELY ALLOCATING RESOURCES IN CLOUD-BASED NETWORKS

FIELD

The present disclosure relates to allocating resources in cloud-based networks.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cloud-based networks allow computer processing and storing needs to be moved from on premises networks to hybrid cloud or fully cloud-based networks while satisfying data security access requirements. A cloud-based network may include physical machines (PMs) and virtual machines (VMs). Cloud applications may be implemented via the PMs and/or the VMs. The cloud applications can be accessed from client stations of organizations at remote locations.

SUMMARY

In other features, a resource allocation system is provided and includes at least one processor, at least one memory; and one or more applications. The one or more applications are stored in the at least one memory and including instructions, which are executable by the at least one processor. The instructions are configured to: receive forecast data from a forecast server computer, where the forecast data indicates a predicted metric value corresponding to a cloud-based service for a first geographical region; determine an expected usage amount for the first geographical region based on the predicted metric value; determine a failover resource amount to cover at least a portion of a load in a second geographical region due to a failure in the second geographical region; determine a first predicted resource allocation value based on the expected usage amount and the failover resource amount; and determine a first reactive resource allocation value based on at least one of the predicted metric value or a parameter. The parameter corresponds to access of cloud-based resources for the cloud-based service. The instructions are further configured to: prioritize the first predicted resource allocation value and the first reactive resource allocation value; and adjust a resource allocation amount for the first geographical region over time based on a result of the prioritization.

In other features, a resource allocation system is provided and includes at least one processor, at least one memory, and one or more applications stored in the at least one memory and including instructions, which are executable by the at least one processor. The one or more applications are configured to: receive forecast data from a forecast server computer including a plurality of performance count values, where the forecast data indicates predicted metric data corresponding to a cloud-based service for a first geographical region; determine an expected usage amount for the first geographical region based on the forecast data, a confidence level and an overload value; determine a failover resource amount to cover a failure in a second geographical region; determine a first resource allocation value based on the expected usage amount and the failover resource amount; and determine a second resource allocation value based on the plurality of performance count values. The instructions are further configured to: prioritize the first resource allocation value and the second resource allocation value; and adjust a resource allocation amount for the first geographical region based on a result of the prioritization.

In other features, a resource allocation system is provided and includes at least one processor, at least one memory, and one or more applications stored in the at least one memory and including instructions, which are executable by the at least one processor. The one or more applications are configured to: load a time series of metric values and scaled resource allocation values corresponding to providing a cloud-based service for a first geographical region; calculate a workload time series based on the time series of metric values and scaled resource allocation values; analyze the workload time series to detect at least one of a pattern of workloads or isolated workloads, where a workload refers to an amount of resource allocation; and based on the detected pattern, generate a predicted schedule of resource allocation amounts for future predetermined periods of time. The resource allocation amounts of the predicted schedule are for the cloud-based service and are determined according to a forecasting algorithm or an autoregressive integrated moving average. The instructions are further configured to allocate cloud-based resources based on the predicted schedule.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
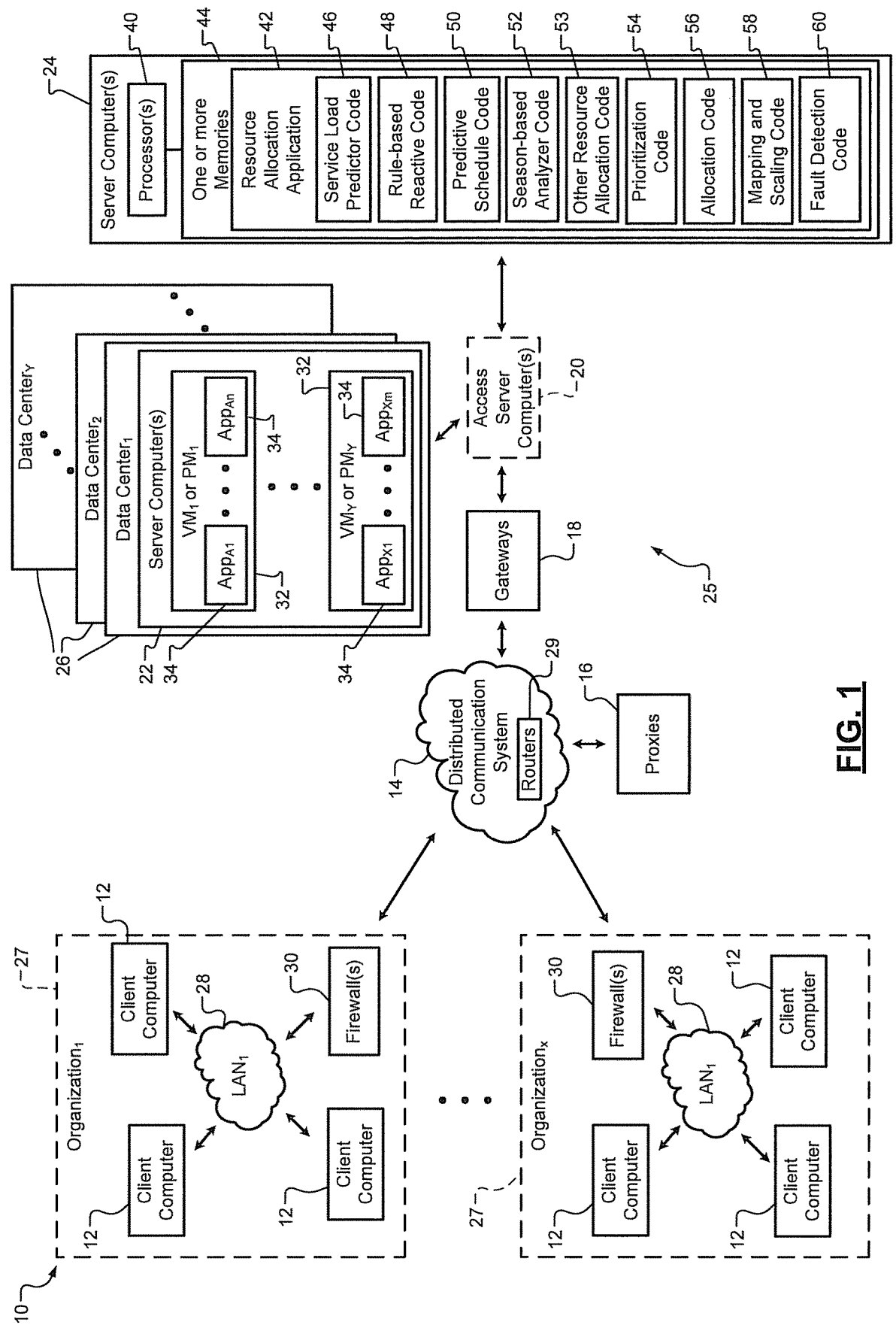
FIG. 1 is a functional block diagram of an example of a portion of a resource allocation system including one or more resource allocation applications in accordance with an embodiment of the present disclosure.

A service provider of one or more cloud-based networks allocates resources to tenants. As an example, a service provider may allocate respective numbers of VMs to tenants in multiple geographical regions. The VMs of each of the geographical regions may be implemented in one or more data centers. A service provider typically allocates VMs to tenants to handle fluctuating load (e.g., number of requests per second). To handle fluctuating load, the service provider via a server computer overprovisions VMs for each of the tenants. This includes allocating more VMs than needed in case, for example, one or more VMs fails or the capacity of the VMs is exceeded. Although overprovisioning prevents and/or minimizes down time and performance delays, overprovisioning increases overhead and operating and maintenance costs due to the increased number of VMs allocated. Underprovisioning refers to when fewer VMs are allocated than needed, which decreases overhead and operating and maintenance costs, but causes high service latency and possibly service unavailability issues.

A required number of VMs for a tenant is typically not constant. An allocated number of VMs for the tenant is adjusted over time based on auto-scaling strategies. Traditional auto-scaling strategies are reactive, such that a number of VMs are adjusted after an issue and/or symptom is detected. Reactive auto-scaling strategies are usually rule-based and include one or more rules for adjusting VM allocation. As an example, a rule of a reactive auto-scaling strategy is, if a detected number of requests per second is greater than a predetermined threshold, then increase the number of allocated VMs by an incremental predetermined amount.

Traditional auto-scaling strategies tend to be slow to react. A certain amount of time is required to detect a change in load and then adjust allocation of resources in response to the change in load. For example, allocating additional VM instances can take up to 15 minutes. The auto-scaling strategies are inefficient since corresponding scaling actions are typically based on fixed predetermined scaling amounts and limited based on the corresponding auto-scaling rules. As an example, spikes in load may not trigger a scaling action if the auto-scaling rules monitor an average load over a predetermined period of time. The auto-scaling rules are manually defined. The traditional auto-scaling strategies are based on predetermined threshold settings that may not define a particular service state and are specific to a single geographical region.

The examples set forth herein include proactive and reactive resource allocation systems that perform predictive and reactive operations to adjust resource allocation and scaling for multiple geographical regions of a service provider. Cloud-based resources are efficiently allocated for multi-region services. An example of a multi-region service is Microsoft® News (MSN®) services, which provide news related services via www.MSN.com to multiple geographical regions around the world. In one example, the predictive operations include generation, adjustment and implementation of a predicted resource schedule. The predictive and reactive operations include determining a service state via data transformation functions (referred to as "functors"). The service state includes a set of estimated predictive and reactive resource allocation amounts. The predictive and reactive resource allocation amounts may be determined based on performance count values and/or the predicted resource schedule. A prioritization process is then performed based on timing conditions and rules. Resources are allocated and scaled based on results of the prioritization. In one example, the resources are scaled independent of whether a predicted resource schedule is generated.

The proactive and reactive resource allocation systems account for failover between nearby data centers. This may occur during predictive resource estimation and/or during resource allocation. Failover amortization refers to the accounting for failover during resource allocation. Failover refers to when a first data center in a geographical region is experiencing issues, such that the first data center is unable to handle a certain amount of load, and a second data center allocates resources to handle the load. An example of an issue is when one or more resources of the first data center is operating inappropriately and/or are down due to, for example, a power failure. The second data center may be in the geographical region or in another geographical region. One or more data centers may allocate resources to handle the load no longer being handled by the first data center. In one example, the one or more data centers are the closest data centers to the first data center. This minimizes distances between the one or more data centers and tenants and thus corresponding delays.

Figure 4:
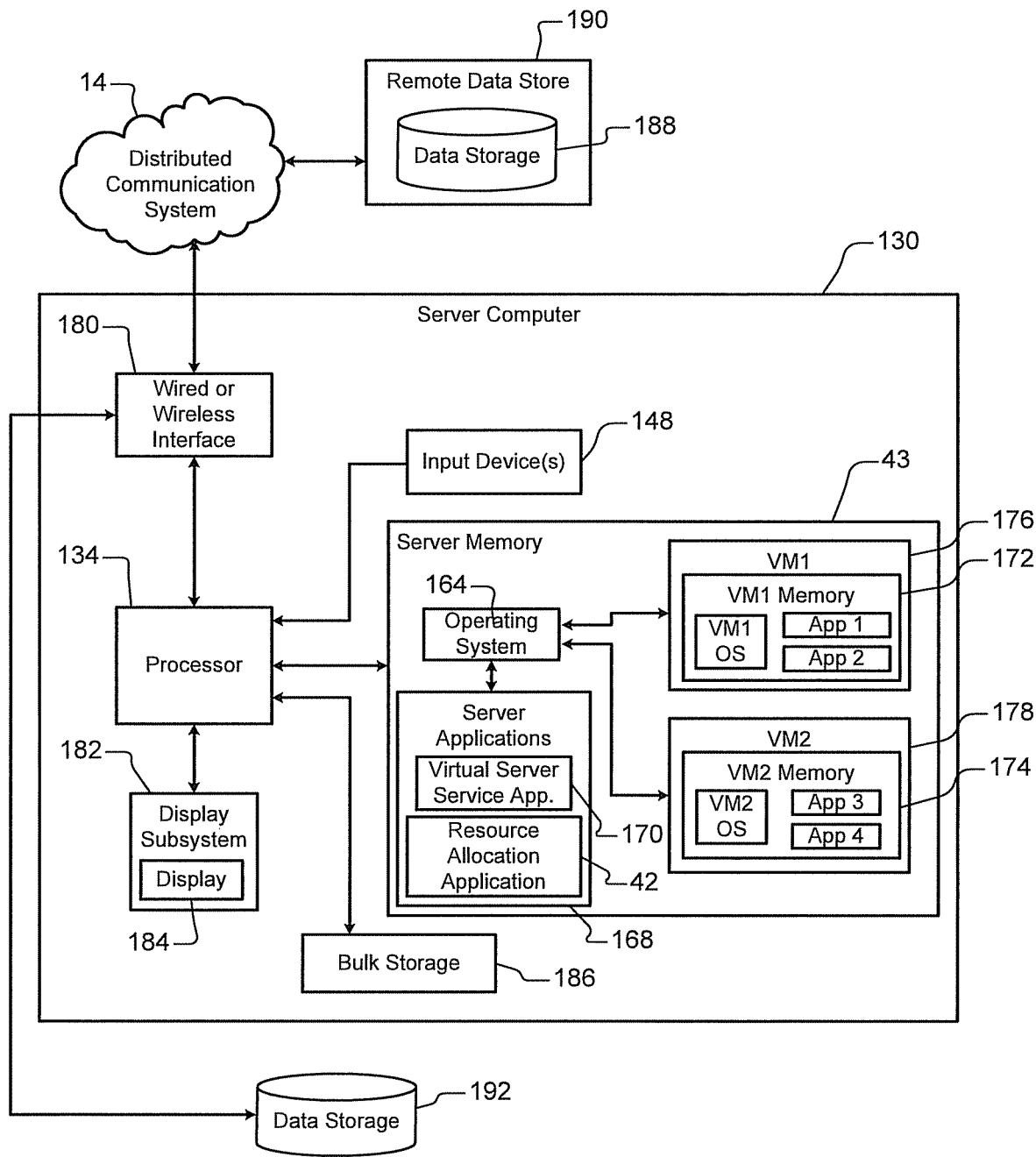
FIG. 4 is a functional block diagram of an example of a server computer incorporating applications in accordance with an embodiment of the present disclosure.

FIG. 1 shows a portion 10 of a resource allocation system that includes client computers 12, a distributed communication system 14, proxies 16, gateways 18, one or more access server computers 20, and other server computers 22, 24. In some examples, the gateways 18, one or more access server computers 20, and one or more server computers 22 are implemented in a cloud-based network 25. The server computers 22, 24 may be implemented in data centers; example data centers 26 are shown. Each of the data centers may include data storage and any number of server computers. Example data storage is shown in FIG. 4.

The data centers may be located in corresponding geographical regions, where each geographical region refers to: geographical areas of one or more businesses; one or more towns; one or more cities; one or more states; one or more countries; a continent; and/or other geographical area. In some examples, the one or more server computers 24 are implemented in the cloud-based network 25 or in another service provider network. In another example, the access server computers 20 are not included in the security system 10 and the gateways 18 communicate directly with the server computers 22, 24. In the example shown, the client computers are owned by corresponding organizations 27. The organizations 27 may include local area networks (LANs) 28 and firewalls 30. The client computers 12 may access the distributed communication system 14 directly and/or via the LANs 28 and firewalls 30. The distributed communication system 14 may include routers 29. One or more of the organizations 27 may include multiple LANs and corresponding client computers, where each LAN and corresponding client computers are located in a corresponding one of the geographical regions of the data centers 26.

The cloud-based network 25 may be implemented by a cloud service provider and, in an embodiment, includes client virtual machines, network appliances and application server computers. Examples of network appliances include routers, switches, firewalls, proxy server computers, World Wide Web (or Web) server computers, wide area network (WAN) accelerators, intrusion detection system (IDS) devices, and intrusion prevention system (IPS) devices. The network appliances provide intermediary services between the application server computers and client computers. The client computers 12 can be implemented in the cloud-based network 25 as VMs and/or PMs 32 or can be located on premises. The network appliances and application server computers may be implemented as one or more VMs of the cloud-based network 25.

The cloud-based network 25 may include one or more of the server computers 22, 24. The cloud-based network 25 further includes resources that may be shared by the client computers 12. The cloud service provider provisions the resources, such as software applications having corresponding executable code, server computer processing time, server computer processor speed, data storage, VMs, PMs, and/or other resources to tenants (e.g., customers and/or businesses) via the cloud-based network 25. A tenant may have one or more subscriptions. A subscription may refer to, for example, rental of one or more resources, a container, a set of machines, a logic subset of machines of a business, and/or a business unit. A business unit includes a set of PMs and/or VMs of a tenant. Cloud service providers implement infrastructure as a service (IaaS) and platform as a service (PaaS) using VMs or containers. A container includes processing, storage and application resources. Data centers may include server computers that host the VMs or containers. Each server can host many VMs and/or containers. The VMs run on a guest operating system and interface with a hypervisor, which shares and manages server hardware and isolates the VMs. Unlike VMs, containers do not need a full OS to be installed or a virtual copy of the host server's hardware. Containers may include a few software modules and libraries and require the use of some portions of an operating system. As a result of the reduced footprint, many more containers can be deployed on a server as compared to virtual machines. The server computers 22, 24 may include VMs (e.g., $VMs_{1-Y}$ are shown), which may be implemented as PMs (e.g., $PMs_{1-Y}$). The software applications may be implemented on the server computers 22, 24, which may be referred to as physical machines.

The client computers 12 may be privately owned by different individuals and/or entities. In the example shown, the client computers 12 are owned by organizations 27. Each of the client computers 12 may access one or more cloud applications 34 stored in the server computers 22 and/or VMs 32. The organizations 27 may own and/or have paid access to corresponding ones of the VMs 32 and/or cloud applications 34. The client computers 12 may include desk/laptop computers, tablets, mobile phones, wearable devices, access terminals, and/or other network devices for accessing the cloud applications 34. Accessing of the cloud applications 34 may include: communicating with the cloud applications 34; transferring data, packets, information, etc. between the client computers 12 and the server computers 22 in association with the cloud applications 34; modifying and/or updating the cloud applications; and/or uploading and/or downloading the cloud applications 34 and/or files associated with the cloud applications 34.

The distributed communication system 14 may include routers, switches and/or other network devices for directing data and/or packets between (i) the client computers 12 and/or organizations 27 and (ii) the gateways 18. The distributed communication system 14 may include a network, such as a local area network (LAN), a wireless local area network (WLAN), and/or a wide area network (WAN) (e.g., the Internet). The proxies 16 may transfer data, packets, information, etc. between the firewalls 30 and the gateways 18. In an embodiment, the proxies 16 are implemented as part of the distributed communication system 14. The gateways 18 may transfer data, packets, information, etc. between the distributed communication system 14 and the access server computers 20. The access server computers 20 may provide access to direct communication with the server computers 22 and/or 24. In one embodiment, the access server computers 20 are implemented as client access server computers and facilitate providing services, such as services associated with software as a service (SaaS) applications, from the server computer 24 to the client computers 12. The gateways 18, the access server computers 20, the server computers 22 and/or the server computers 24 may be implemented in an internal network of a service provider that provides software applications.

Each of the server computers 24 includes one or more processors 40 that execute software applications, such as a resource allocation application 42, which is stored in one or more memories 44. One or more of the VMs 32 and/or other resources to be allocated to customers may be implemented in the server computers 24. The resource allocation application 42 includes service load predictor code 46, rule-based reactive code 48, a predictive schedule code 50, a season-based analyzer code 52, other resource allocation code 53, a prioritization code 54, an allocation code 56, a mapping and scaling code 58 and a fault detection code 60. Although the codes 46, 48, 50, 52, 53, 54, 56, 58 and 60 are shown as being part of a single application (the resource allocation application 42), the codes 46, 48, 50, 52, 53, 54, 56, 58 and 60 may be implemented as part of two or more applications.

The resource allocation application 42 may be provided as a service application by the service provider and provide smart cloud-based resource allocation services. The resource allocation application 42 is used to monitor resource loading of cloud-based resources implemented in the cloud-based network 25. The resource allocation application 42 monitors behavior of the client computers 12 and/or users of the client computers 12 directed to access of the cloud-based resources including access of the applications 34 and VMs/PMs 32. The resource allocation application 42 collects data, parameters, and/or information associated with the behavior to detect load and/or use patterns. The resource allocation application 42 may monitor, for example, traffic between client computers of organizations and accessed cloud applications, VMs and PMs. The resource allocation application 42 monitors information, such as data, logs, parameters, and/or other information associated with access of the cloud applications, VMs and PMs. The parameters may include and/or be derived from: data transfer rates; data transfer times; requests per second; source and destination Internet protocol (IP) addresses; identifiers (IDs) of geographical regions where requests are generated, received and/or addressed; IDs of ports; IDs of data centers; IDs of server computers; tenant IDs; subscription IDs; and/or other traffic flow and/or loading information. The traffic flow and/or loading information may be used to detect patterns. This is further described below. The requests per second may refer to requests of customers, client computers, VMs, PMs, and/or other entities of a tenant.

Execution of the codes 46, 48, 50, 52, 53 may include execution of respective algorithms and/or methods including use of one or more equations to determine appropriate amounts of resources to allocate during a current period of time and/or during a future period of time. The codes 46, 48, 50, 52, 53 may be iteratively executed for consecutive periods of time, for each data center of a service provider, and/or for each geographical location of the data centers of a service provider. Each of the codes 46, 48, 50, 52, 53 corresponds to one or more functors. The functors may refer to pluggable data transformation functions (e.g., forecasting functions) that take an ordered list of tuples (e.g., time and a metric) and provide a projection of an amount of resources to be allocated. The term "pluggable" refers to the ability to add and remove an entity and/or feature, such as a functor. Each of the functors provides resource allocation amounts of each data center and/or geographical region. As an example, each of the functors may provide an estimated (predictive and/or reactive) number of VMs to allocate to each data center and/or geographical region over time.

The service load predictor code 46 determines, based on forecasted load values, appropriate amounts of resources to allocate currently based on a previous prediction and predicts an appropriate amount of resources to allocate in the future. The rule-based reactive code 48 reacts to current load values based on a predetermined set of rules to determine an appropriate amount of resources to allocate. The predictive schedule code 50 generates, modifies, and/or rebuilds a predicted resource allocation schedule. The season-based analyzer code 52 monitors parameters and load values to detect patterns and determines appropriate amounts of resources to allocate currently and/or in the future based on the detected patterns. The other resource allocation code 53 may perform other algorithms to determine appropriate amounts of resources to allocate currently and/or in the future based on other parameters.

The prioritization code 54 operates as an arbitrator and/or converter and receives the outputs generated by the functors and determines based on a predetermined set of conditions and/or rules appropriate amounts of resources to allocate to each data center and/or geographical region. In one embodiment, the conditions and/or rules may be time based. The allocation code 56 allocates resources based on results of the prioritization. This may include failure amortization. The mapping and scaling code 58, based on allocation output values from the allocation code 56, "scales in" meaning to reduce an amount of one or more resources of one or more resources allocated, maintains a current resource allocation (i.e. no resource allocation adjustment recommendation), and/or "scales out" meaning to increase an amount of one or more resources allocated.

The fault detection code 60 may detect when there is a fault (or issue) with one or more resources and/or data centers and indicate the detected faults to one or more processors executing the codes 46, 48, 52, 53, 56, 58. The one or more processors executing the codes 46, 48, 52, 53, 56, 58 may adjust corresponding values based on the detected faults. For example, if a first data center in a geographical region is experiencing a fault, the codes 46, 48, 52, 53, 56, 58 may adjust resource allocation values to increase allocation from one or more other data centers to the geographical region. The resource allocation application 42 may perform maintenance operations and/or other corrective actions to correct the fault.

Figure 2:
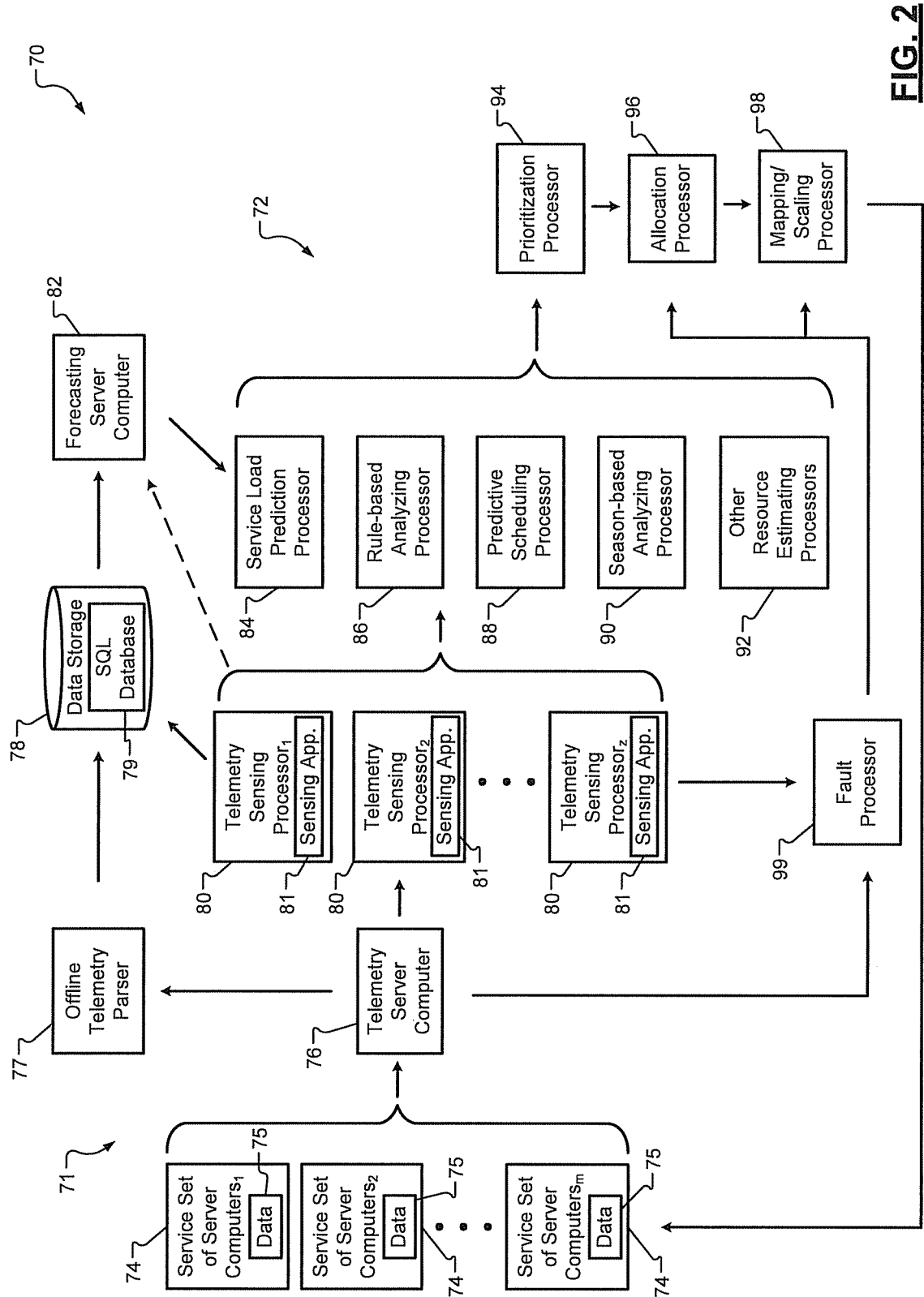
FIG. 2 is a functional block diagram of an example of another portion of the resource allocation system of FIG. 1 including a data storage and metric forecasting system and a proactive and reactive allocation system in accordance with an embodiment of the present disclosure.

Referring now also to FIG. 2, which shows another portion 70 of the resource allocation system of FIG. 1 including a data storage and metric forecasting system 71, a proactive and reactive allocation system 72, and service set of server computers 74. Each of the service set of server computers 74 monitor traffic and collect data associated with one or more corresponding services provided by the service set of server computers 74 to customer computers, VMs and PMs. As an example, one of the service set of service computers 74 may provide the MSN service and collect data associated with this service. The data collected may include the parameters disclosed herein and/or other related information associated with access of the cloud-based resources. Each of the service set of server computers 74 may provide the one or more corresponding services to corresponding data centers (e.g., the data centers 26) and/or corresponding geographical regions.

The collected information associated with the access of cloud-based resources is tracked over time and may be stored in the proxies 16, gateways 18, routers 29, firewalls 30, memories (e.g., memories 44) of the server computers 20, 22, 24, and/or data storage (e.g., one or more of data storages shown in FIGS. 2, 4). As an example, a log of access information may include an access start time, an access end time, a duration of access, an IP address of a sending entity, an IP address of a receiving entity, a username, a cloud application name, an upload volume of data, a download volume of data, a number of transactions, a number of accesses, a number of accesses in a predetermined period, a number of requests per second, a geographical location where the access occurred, etc.

The resource allocation application 42 may request, receive, access, and/or track network activity, parameters and other related information from various sources. As a first example, the resource allocation application 42 collects network activity, parameters and other related information from Internet protocol version 6 (IPv6) conforming devices and/or entities. The IPv6 conforming device and/or entities may include the server computers 20, 22, 24, the VMs and/or PMs 32, and/or other IPv6 conforming devices and entities within the cloud-based network 25 and/or outside the cloud-based network 25. The IPv6 conforming devices log network activity between, for example, corresponding local area networks (LAN) and the Internet. As another example, one or more of the VMs and PMs 32 include an application (e.g., one or more of the applications 34) configured to operate as an agent, which reports network activity, parameters and other related information tracked to the resource allocation application 42. As yet another example, the resource allocation application 42 may collect network activity, parameters and other related information from "partners". In one embodiment, the partners include applications executed on the proxies 16, the gateways 18, the access server computers 20, the routers 29, and/or the firewalls 30.

The resource allocation application 42 may determine one or more parameters to monitor. The selected parameters may be requested from the IPv6 conforming devices and/or entities, the agents, and/or the partners. Some additional examples of parameters are: a user identifier; a client computer identifier; an address of the client computer; a cloud application identifier; a number of transactions between a user/client computer and one or more cloud applications; an amount of traffic between a user/client computer and one or more cloud applications; a number of transactions between a user/client computer and one or more cloud applications with a predetermined period of time; an amount of traffic between a user/client computer and one or more cloud applications within a predetermined period of time; periods of use of one or more cloud applications by a user/client computer; a total number of cloud applications accessed by a user/client computer; and a total number of cloud applications accessed by a user/client computer within a predetermined period of time. Some additional examples are: periods of use of one or more cloud applications by a user/client computer; total number of cloud applications accessed by a user/client computer; and total number of cloud applications accessed by a user/client computer within a predetermined period of time.

The parameters may be for one or more users/client computers, users/client computers of an organization, a predetermined group of users/client computers, and/or one or more cloud applications. The monitored parameters may be monitored per user, per client computer, per cloud application, per VM, per PM, and/or a combination thereof. The parameters and/or risk factors may be stored in tables in the memories 44 and accessed during the operations described herein.

The data storage and metric forecasting system 71 may include a telemetry server computer 76, an offline telemetry parser 77, a data storage 78 including a structured query language (SQL) database 79, telemetry sensing processors 80 and a forecasting server computer 82. The proactive and reactive allocation system 72 includes a service load prediction processor 84, a rule-based analyzing processor 86, a predictive scheduling processor 88, a season-based analyzing processor 90, other resource estimating processors 92, a prioritization processor 94, an allocation processor 96, and a mapping and scaling processor 98. The SQL database may store telemetry tables including historical data received from the offline telemetry parser 77 and the telemetry sensing processors 80.

One or more of the telemetry sensing processors 80 may be implemented as a single telemetry sensing processor. The telemetry sensing processors 80 may each include a sensing application 81 that operates as a sensor. In one embodiment, the sensing applications 81 operate as extendable modules that monitor states of service. Two or more of the sensing applications 81 may be implemented by a single telemetry sensing processor. The forecasting server computer 82 performs a forecast service based on time series models to forecast user load per service and per data center. The processors 84, 86, 88, 90, 92 process data received from the forecasting server computer 82 and/or the telemetry sensing processors 80. The processors 94, 96, 98 may be referred to as agents that perform actions based on processing output results provided by the processors 84, 86, 88, 90, 92. In one embodiment, these agents operate as stateful entities that define how the sensing applications 81 and the processors 84, 86, 88, 90, 92 (or corresponding functors) are configured and what actions to take based on inputs and outputs of the sensing applications 81 and the processors 84, 86, 88, 90, 92 (or corresponding functors). The processors 94, 96, 98 may be notified by the sensing applications 81 when data is available and/or is missing.

The sensing applications 81, the functors (e.g., provided by processors 84, 86, 88, 90 and 92), and the agents (e.g., processors 94, 96, 98) are modular and pluggable. Any number of sensing applications, functors, and agents may be included. Sensing applications, functors and agents may be removed, added, and/or swapped out and replaced with other sensing applications, functors or agents. This allows for customized configuring of the proactive and reactive allocation system 72. As an example, a functor for an advanced reactive model may be added to the system. The added functor may receive data from the forecasting server computer 82 and/or the sensing applications 81 and provide resource allocation values to the prioritization processor 94. The prioritization processor 94 may then generate an output and/or a resource allocation request based on the output of the added functor. As another example, an event-driven functor (e.g., a functor corresponding to a sports event) may be added that has predetermined time windows. As another example, an agent may be added that uses service metrics to perform maintenance and corrective service actions (e.g., reboot faulty/stuck VMs or take predefined actions based on DevOps configurations).

Operations of the telemetry server computer 76, the offline telemetry parser 77, the data storage 78, the SQL database 79, the forecasting server computer 82, and the processors 80, 84, 86, 88, 90, 92, 94, 96, and 98 are further described below with respect to the methods of FIGS. 5-7 and 9-11. The processors 40 of FIG. 1 may include the processors 84, 86, 88, 90, 92, 94, 96, 98.

The proactive and reactive allocation system 72 may also include a fault processor 99 that may execute the fault detection code 60 to detect faults. The fault processor 99 may be one of the processors 40 of FIG. 1. The faults may be detected based on the data collected by the telemetry server computer 76, the data monitored by the telemetry sensing processors 80, the metric values forecasted by the forecasting server computer 82, and/or signals received from a processor of a data center experiencing issues. The fault processor 99 may generate a fault signal indicating the faults to the allocation processor 96 and/or the mapping and scaling processor 98, which may adjust resource allocation, mapping and/or scaling accordingly. The fault processor 99 may also operate as an agent and may be informed of when data is available and/or missing. The fault processor 99 may be informed of when VMs, PMs, data storage devices, and/or nearby data centers are experiencing issues and generate the fault signal accordingly to indicate the issues.

Figure 3:
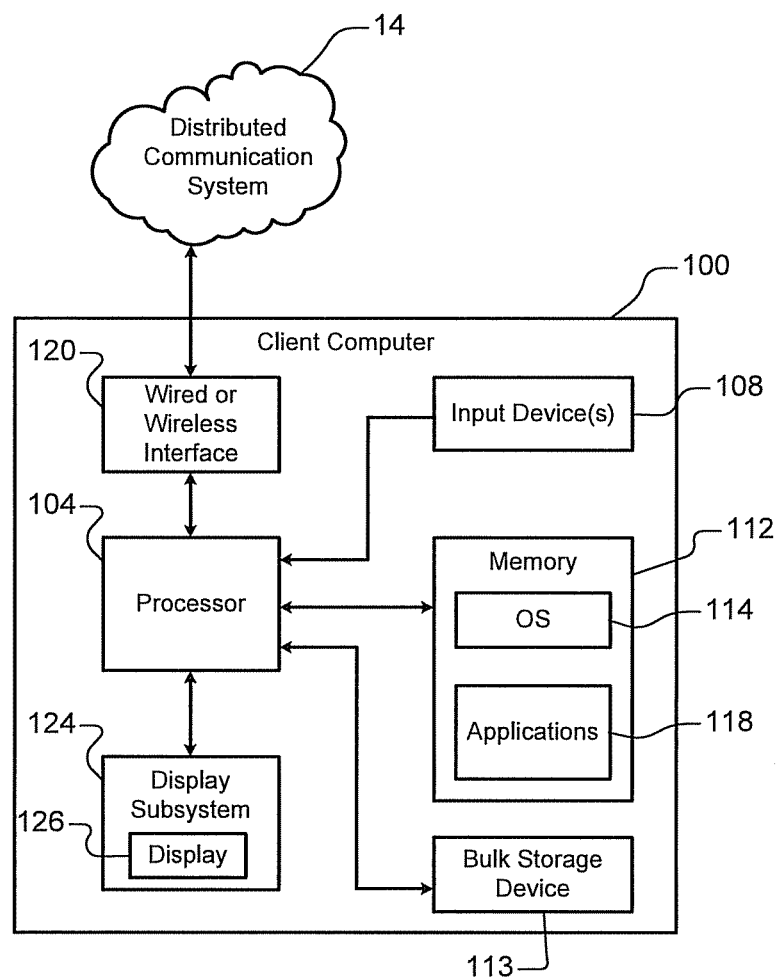
FIG. 3 is a functional block diagram of an example of a client computer in accordance with an embodiment of the present disclosure.

In FIG. 3, a simplified example of a client computer 100 is shown. The client computers 12 of FIG. 1 may be implemented as the client computer 100. The client computer 100 includes a central processing unit (CPU) or processor 104 and an input device 108 such as a keypad, touchpad, mouse, etc. The client computer 100 further includes memory 112 such as volatile or nonvolatile memory, cache or other type of memory. The client computer 100 further includes bulk storage device 113 such as flash memory, a hard disk drive (HDD) or other bulk storage device.

The processor 104 of the client computer 100 executes an operating system 114 and one or more applications 118. For example, the applications 118 may include a browser. The client computer 100 further includes a wired interface (such as an Ethernet interface) and/or wireless interface (such as a Wi-Fi, Bluetooth, near field communication (NFC) or other wireless interface (collectively identified at 120)) that establishes a communication channel over the distributed communication system 14. The client computer 100 further includes a display subsystem 124 including a display 126.

In FIG. 4, an example of a server computer 130 is shown. The server computers 20, 22, 24 of FIG. 1 may be implemented as and/or have similar architecture as the server computer 130. The server computer 130 includes one or more processors and an input device 148 such as a keypad, touchpad, mouse, etc. The server computer 130 further includes a server memory 132, such as volatile or nonvolatile memory, cache or other type of memory, and a processor 134. The processor 134 executes an operating system (OS) 164 and one or more server applications 168 and/or VM applications. Examples of server applications include the resource allocation application(s) 42 and a virtual server service application 170, which is implemented in a virtualization layer and is executed along with the OS 164. The server applications 168 include code (e.g., one or more of the codes 46, 48, 50, 52, 53, 54, 56, 58 and 60). The virtual server service application 170 creates a virtual environment in which VM (or guest) OSs (e.g., VM1 OS and VM2 OS) run. Example VM applications App 1, App 2, App 3, and App 4 are shown as being implemented in VM memories 172, 174 of VMs 176, 178, respectively. The VM applications may include instances of auto-generated websites, network appliances, storage applications, productivity applications, and/or other VM applications. VM applications App 1-4 are shown as examples. Each of the VM memories may include one or more VM applications.

The server computer 130 further includes a wired or wireless interface 180 that establishes a communication channel over the distributed communication system 14. The server computer 130 further includes a display subsystem 182 that includes a display 184. The server computer 130 may further include a bulk storage device 186 such as flash memory, a hard disk drive (HDD) or other local or remote storage device. The processor 134 may also access a data storage 188 of a remote data store 190 via the interface 180 and the distributed communication system 14, or a data storage 192, such as a database, via the interface 180.

Figure 5:
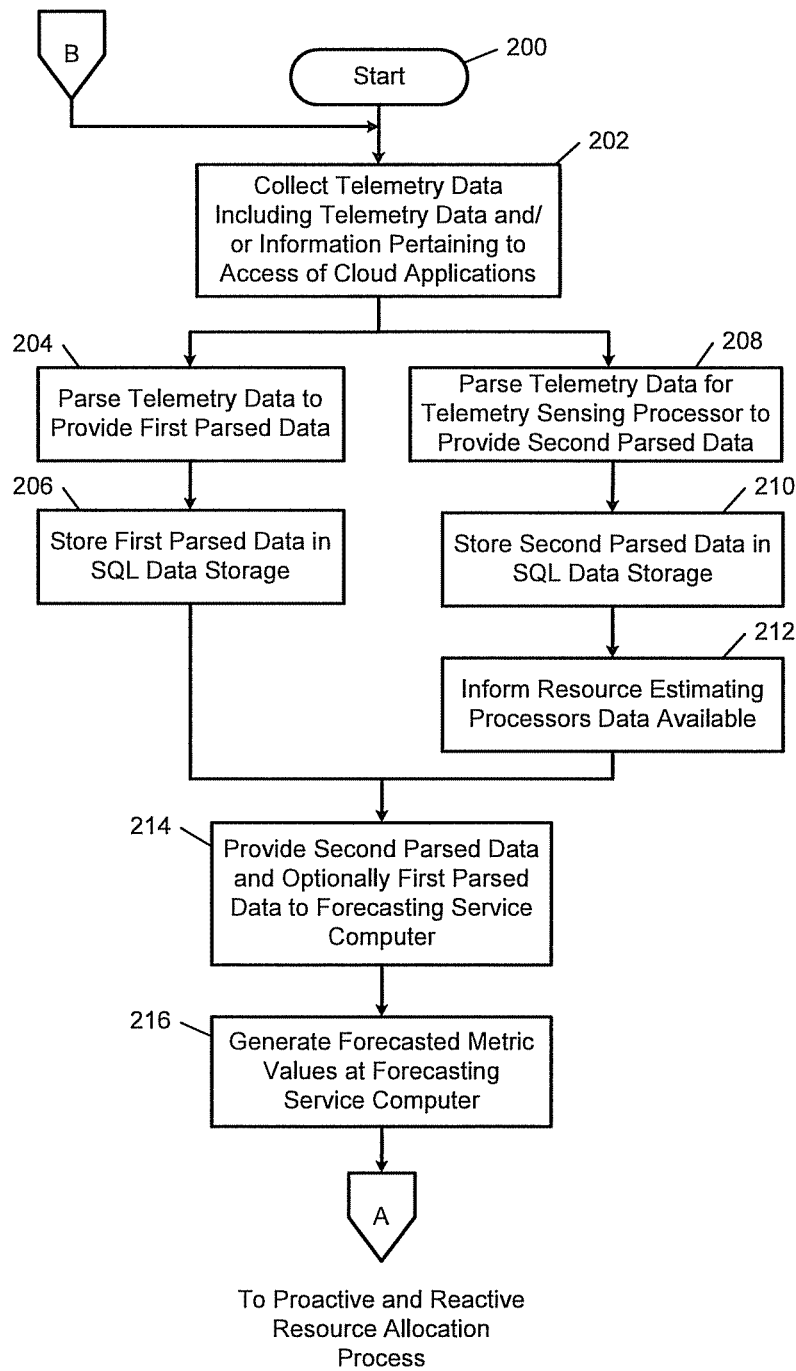
FIG. 5 illustrates an example of a data storage and metric forecasting method in accordance with an embodiment of the present disclosure.

FIG. 5 shows a data storage and metric forecasting method. The method begins at 200 and includes execution of the resource allocation application 42 by the one or more processors 40. Although the following operations are primarily described with respect to the implementations of FIGS. 1-2, the operations may be modified to apply to other implementations of the present disclosure. The operations may be iteratively performed.

The method may begin at 200. At 202, the telemetry server computer 76 collects the above-stated data collected by the service set server computers 74 from the service set server computers 74. The data may include telemetry data, the stated parameters, performance count values and other data. The telemetry server computer 76 may be implemented as an extensible master data management platform having a set of tools, processes, and policies to manage the data. The collected data may be referred to as "raw" data. The raw data may be collected from Microsoft Windows® servers providing cloud-based services.

At 204, the offline telemetry parser 77 parses first data from the collected data. The offline telemetry parser 77 may separate a certain portion of the data collected by the telemetry server computer 76 and forwards the separated first parsed data to the data storage 78. At 206, the offline telemetry parser 77 stores the first parsed data in the SQL database 79 of the data storage 78.

At 208, the sensing applications 81 and thus the telemetry sensing processors 80 parse second data from the collected data. Each of the sensing applications 81 operate as a sensor and pulls data associated with one or more resources from the telemetry server computer 76. For example, in one embodiment, each of the sensing applications 81 pulls data from the telemetry server computer 76 for a corresponding one or more VMs. At 210, the sensing applications 81 store the second parsed data in the SQL database 79 of the data storage 78. The data stored in the SQL database 79 during operating 206 and 210 may be referred to as historical data.

At 212, the sensing applications 81 via the telemetry sensing processors 80 generate signals and transmit the signals to the processors 84, 86, 88, 90, 92. The signals indicate that data has been received, stored in the SQL database 79 and is available for access. The sensing applications 81 may also signal the forecasting server computer 82 that the data is available for access.

At 214, forecasting service computer 82 receives the second parsed data and optionally the first parsed data from the SQL database 79. The forecasting service computer 82 may pull the second parsed data and optionally the first parsed data from the SQL database 79.

At 216, the forecasting service computer 82 generates forecasted metric values for preselected metrics based on the second parsed data and optionally the first parsed data. The forecasted metric values may be referred to as performance count values. An example performance count value is a number of requests per second (or load), which may be forecasted for one or more periods of time including a current period of time and one or more future periods of time. Other example metrics/performance count values are load per service, load per data center, and load per geographical region. The forecasting server computer 82 may determine the forecasted metric values using a machine learning algorithm including an autoregressive integrated moving average (ARIMA). Operations of the forecasting server computer 82 may be based on: ARIMA models and/or other statistical models; and/or time series data having seasonal behaviors. The forecasting server computer 82 may forecast metric values for each tenant, set of VMs, set of PMs, set of data storage resources, data centers, periods of time, etc.

Figure 6:
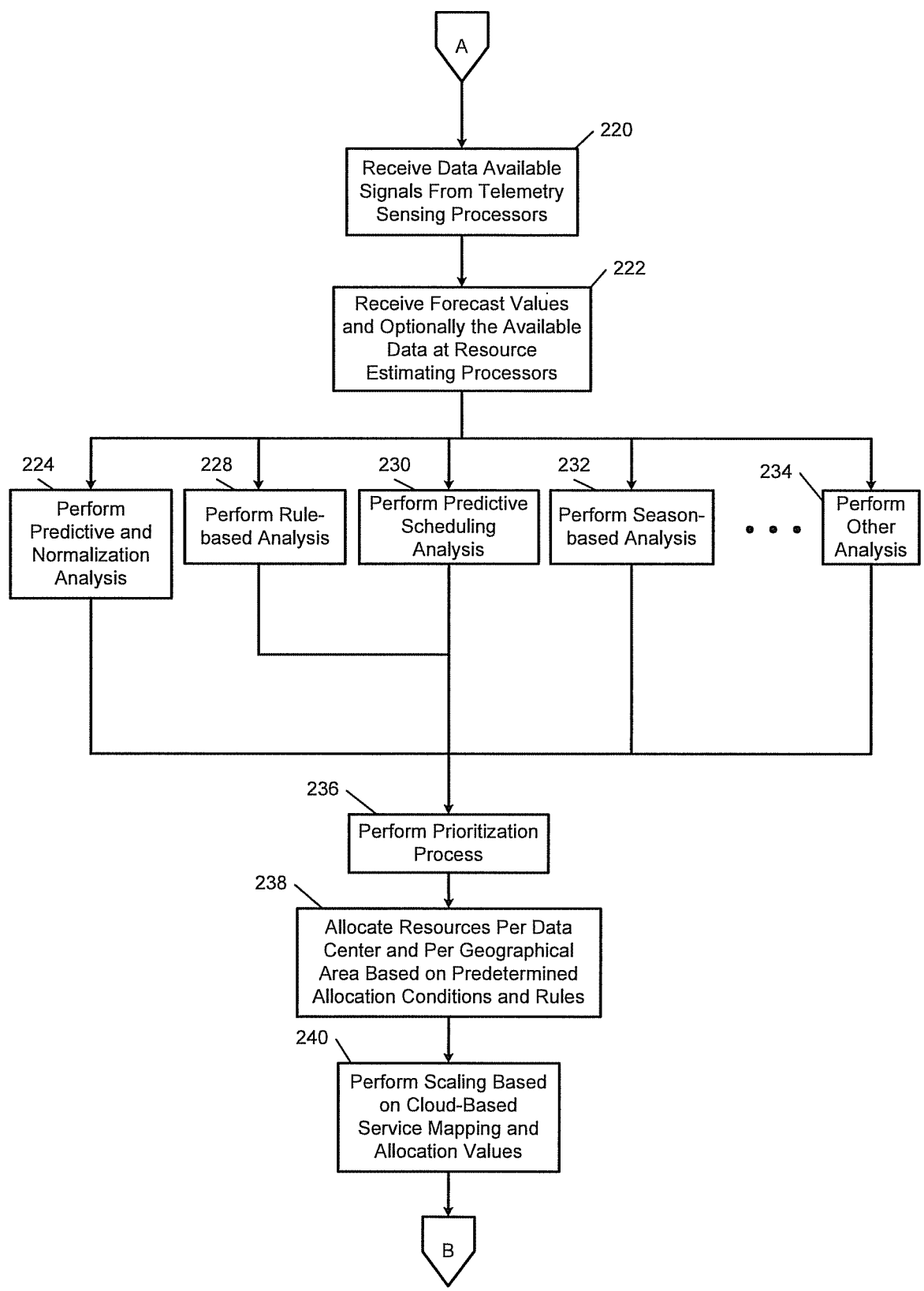
FIG. 6 illustrates an example of a proactive and reactive resource allocation method in accordance with an embodiment of the present disclosure.

FIG. 6 shows a proactive and reactive resource allocation method. The method of FIG. 6 may be performed subsequent to the method of FIG. 5. The method of FIG. 6 includes execution of the resource allocation application 42 by the one or more processors 40 and execution of the codes 46, 48, 50, 52, 53, 54, 56, 58 by the processors 84, 86, 88, 90, 92, 94, 96, 98. The method of FIG. 6 may begin at 220. At 220, the processors 84, 86, 88, 90, 92 receive the signals indicating that the data stored in the SQL database 79 is available for access. At 222, the processors 84, 86, 88, 90, 92 receive the forecasting metric values including forecast loads from the forecasting server computer 82 and may optionally receive the data collected by the sensing applications 81. In one embodiment, the service load prediction processor 84 receives a number of requests per second $RPS_f$. The following operations 224, 228, 230, 232, 234 include predictive operations and reactive operations that are performed based on the forecast metric values and/or loads, which may include performance count values.

At 224, the service load prediction processor 84 executes the service predictor code to perform a predictive and normalization analysis based on the forecasting metric values and optionally the available data to predict first resource allocation values. In one embodiment, the predictive and normalization analysis include determining resource allocation values for predetermined periods of time and respectively for each data center (e.g., the data centers 26) and geographical region. In one embodiment, a number of VMs is determined using equation 1 for each period of time, data center and/or geographical region, where: $VM_i$ is the number of VMs for a parameter set i; $RPS_t$ is a predetermined maximum number of requests per second; CONF is a confidence value; OVL is an overload value; TRF % is a percentage of traffic from a closest data center in case of failover (e.g., dynamic failover); $VM_{i-1}'$ is a number of VMs allocated for a first adjacent data center, and $VM_{i+1}'$ is a number of VMs allocated for a second adjacent data center. Each parameter set i may refer to a particular period of time, a particular time, a data center, a geographical region and/or other parameter. The predetermined maximum number of requests per second $RPS_t$ is measured during a load test performed in a testing environment to determine a maximum number of requests per second a service can handle. The confidence value CONF is a percentage of $RPS_t$ that is adequate for efficient operation. The overload value OVL is a number of extra VMs to be allocated in case of: issues with other VMs of a corresponding data center and/or geographical region; deployments of VMs; Microsoft Windows® updates; and/or issues with other VMs in nearby/adjacent data centers and/or geographical regions. As an example, the overload value OVL may be a percentage (e.g., 10% or 20%) of a number of VMs to be allocated to a data center and/or geographical region. As another example, if 5 VMs are allocated based on current loading for a certain data center and geographical region, and the overload value OVL is 20%, then an additional VM (i.e. 20% of 5) is allocated. The traffic percentage TRF % is an amount of additional traffic to be handled at a first data center due to a nearby data center experiencing issues.

$$VM_i = \left[\frac{RPS_f}{RPS_t \times CONF} \times (1 + OVL)\right] + [TRF\ \% \times \max(VM'_{i-1}, VM'_{i+1})] \quad (1)$$

$$VM'_i = \left[\frac{RPS_f}{RPS_t \times CONF} \times (1 + OVL)\right] \quad (2)$$

$$[TRF\ \% \times \max(VM_{i-1}, VM_{i+1})] \quad (3)$$

Equation 1 includes a first portion ($VM_i'$) and a second portion (TRF %×max($VM_{i-1}'$, $VM_{i+1}'$). The first portion is an expected usage amount and is shown above as expression 2. The first portion provides a number of VMs expected to be used in a data center. The first portion is associated with allocation and normalization and converts metric values (or performance count values) to the expected usage amount. The second portion is a failover amount and is shown above as expression 3. The second portion provides a failover number of VMs for neighboring data centers and/or geographical regions. The second portion is associated with failover allocation. In one embodiment, if operations 228, 230, 232, 234, and 236 are not performed, equation 1 may be used to perform both operations 224 and 238.

The normalization process provides resource allocation values of a similar type and format as resource allocation values determined during the following operations 228, 230, 232, 234. For example, if the resource allocation being estimated is provided in a number of VMs, then the normalization process may convert an expected usage amount into a number of VMs. Each of the operations 228, 230, 232, 234 may also provide an expected number of VMs. The values provided by the operations 224, 228, 240, 232, 234 may then be provided for different time periods, weighted, averaged and/or summed to provide a best estimate of predicted and/or expected loading, and/or used to determine a best estimate of predicted and/or expected loading. In one embodiment, the number of VMs provided by the service load prediction processor 84 are used for different times than the number of VMs provided by the rule-based analyzing processor 86. This is further described below with respect to FIG. 7. Although normalization is described as being provided for operation 224, normalization may be performed for other proactive and/or reactive resource allocation operations, such as operations 228, 230, 232, 234.

At 228, the rule-based analyzing processor 86 executes the rule-based reactive code 48 to perform a rule-based analysis on the forecasting metric values and optionally the available data to estimate second resource allocation values. The second resource allocation values are determined based on a predetermined set of rules. For example, a first set of rules may be used to determine a set of processor based resource requirements (e.g., a number of processors, an amount of processing time, a processing speed, etc.). Another second of rules may be used to determine an estimated amount of loading (e.g., a number of requests queued for a resource service being provided). The second resource allocation values are then determined based on the set of processor based resource requirements and the estimated amount of loading.

At 230, the predictive scheduling processor 88 executes the predictive schedule code 50 to generate, modify and/or regenerate a predicted resource allocation schedule. This may be based on the forecasting metric values and/or the available data and may include performing the method of FIG. 10. The predicted resource allocation schedule may include, for certain times and/or periods, estimated amounts of resources (e.g., number of VMs). The predicted resource allocation schedule may be used to predict third resource allocation values.

At 232, the season-based analyzing processor 90 executes the season-based analyzer code 52 to detect patterns and predict and estimate amounts of resources based on the patterns, the forecasted metric values and/or the available data. The season-based analyzing processor 90 may be used to predict fourth resource allocation values. Machine learning algorithms may be used to predict and/or estimate the amounts of resources. Customer usage typically has recurrent patterns, such as recurrent load patterns. As an example, customer loading for a certain service may be low in the evening and high during the day. The customer may have a repeating pattern every workday or weekend. If a pattern (e.g., a data transfer rate pattern, a traffic flow pattern, a request per second, or other pattern) is detected, then the machine learning algorithms are better able to predict future loading. Detecting patterns in resource loads of services (e.g., news services, cloud-based applications, cloud-based resources, etc.) allows for better predictions, which improves performance by providing an appropriate amount of resources. Stateless services (e.g., new services) have distinct recurring and easily detectable patterns.

At 234, the other resource estimating processors 92 executes the other resource allocation code 53 to predict and estimate amounts of resources based on the forecasting metric values and/or the available data. The other resource estimating processors 92 may be used to predict fifth resource allocation values. Although not described above, one or more of operations 228, 230, 232 and 234 may include normalization similar to the normalization performed during operation 224.

At 236, the prioritization processor 94 executes the prioritization code 54 to determine which of the resource allocation values provided by operations 224, 228, 230, 232, 234 are to be selected and/or used to adjust current resource allocation amounts. As an example, if operations 230, 232, 234 are not performed, the resource allocation values provided from operation 224 may be selected and used for different times than the resource allocation values provided from operation 228.

At 238, the allocation processor 96 executes the allocation code 56 to allocate an appropriate amount of resources. This includes accounting for potential issues with resources and/or performing failover amortization. An example of providing failover protection is provided by the second portion of equation 1. An example of failover amortization is described below with respect to FIG. 8.

At 240, the mapping and scaling processor 98 executes the mapping and scaling code 58 to scale in (or down), maintain, or scale out (or up) an amount of allocated resources. As an example, this may include changing resource allocations including a number of VMs, PMs, application instances, network access time, amount of storage, processor speed, etc. The mapping relates the amounts of allocated resources to the data centers and geographical regions. The scaling may be performed based on the predictive resource schedule generated, modified and/or regenerated during operation 230. Resource allocation and scaling may be based on global loading. One geographical region may be allocated less resources then previously allocated if another region is experiencing issues. The geographical region experiencing the issues may be allocated additional resources. Provisioning of resources is based on auto-scaling.

In one embodiment, when a reactive action is performed based on the reactive resource allocation values, the reactive action is applied to the corresponding data center. However, when a proactive action is performed based on the proactive resource allocation values, the proactive action can affect two or more data centers. This is because the reactive resource allocation values may be associated with a particular data center and not other data centers. The proactive resource allocation values may be generated for multiple data centers and be correlated.

The above-described operations of FIGS. 5-6 are meant to be illustrative examples; the operations may be performed sequentially, synchronously, simultaneously, continuously, during overlapping time periods or in a different order depending upon the application. Also, any of the operations may not be performed or skipped depending on the implementation and/or sequence of events.

Figure 7:
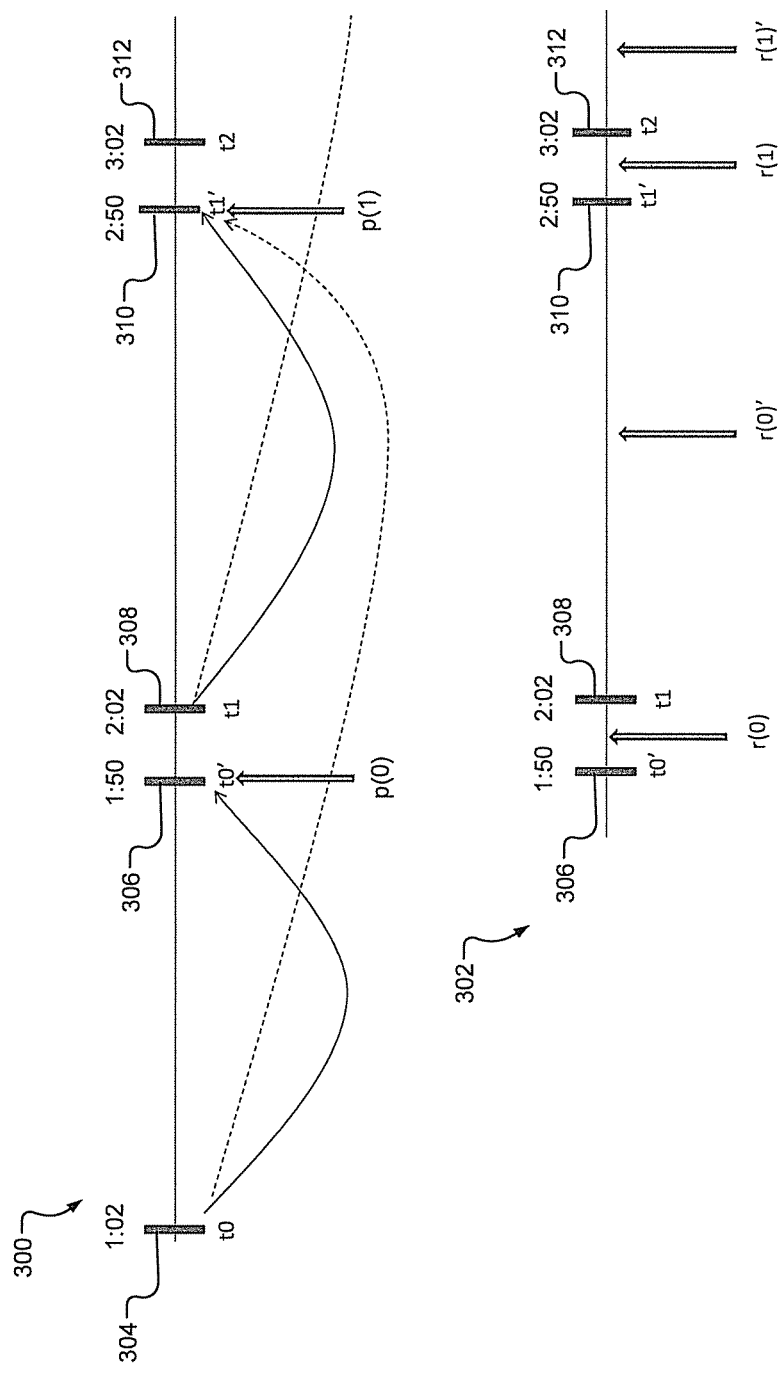
FIG. 7 is a diagram illustrating example timing of proactive and reactive resource allocation/scaling adjustments in accordance with an embodiment of the present disclosure.

FIG. 7 shows a diagram illustrating example timing of proactive and reactive resource allocation/scaling adjustments. The diagram includes a top portion 300 and a bottom portion 302. The top portion 300 illustrates an example of when proactive (current and predicted) resource allocation values provided by the service load prediction processor 84 are used. The bottom portion 302 illustrates an example of when reactive resource allocation values provided by the rule-based analyzing processor 86 are used. The proactive resource allocation values are used based on a first set of rules. The reactive resource allocation values are used based on a set of conditions and a second set of rules.

In FIG. 7, the blocks 304, 308 and 312 refer to when the proactive resource allocation values are determined. The blocks 306, 310 refer to when the proactive resource allocation values are applied. In the example shown, the proactive resource allocation values are applied 10 minutes prior to the next prediction (e.g., a proactive resource allocation value is applied at 1:50, 10 minutes prior to the next prediction at 2:00). This provides time for the corresponding scaling to occur. Two proactive resource allocation values are identified as p(0) and p(1). The two proactive resource allocation values are adjusted, for the shown example, 10 minutes after the proactive resource allocation values are applied. This updates the predictions for current periods that were previously made at a beginning of or prior to a previous period.

The first set of rules includes rules for an initial event and rules for each subsequent event. The initial event refers to estimating a first proactive resource allocation value for a current period of time t0 (e.g., 1:00 pm-2:00 pm) and a second proactive resource allocation value for a future period of time t0' (2:00-3:00). The rules for the initial event include: discarding the second proactive resource allocation value (i.e. not applying the second proactive resource allocation value) if the second proactive resource allocation value is associated with decreasing a current resource allocation amount; applying the second proactive resource allocation value if the second proactive resource allocation value is associated with increasing the current resource allocation amount.

The subsequent events refer to estimating a first proactive resource allocation value for a current period of time t1 (e.g., 2:00 pm-3:00 pm) and a second proactive resource allocation value for a future period of time t1' (e.g., 3:00-4:00). The rules of the subsequent events include: applying the proactive resource allocation value when (i) the proactive resource allocation amount for the previous period (e.g., 1:00-2:00) is associated with increasing the resource allocation amount, and (ii) the proactive resource allocation value for the previous period (e.g., 1:00-2:00) is associated with decreasing the resource allocation amount and the proactive resource allocation value for the current period (e.g., 2:00-3:00) is associated with decreasing resource allocation amount. The rules of the subsequent events also include discarding the proactive resource allocation value when the proactive resource allocation value for the previous period (e.g., 1:00-2:00) is associated with decreasing the resource allocation amount and the proactive resource allocation value for the current period (e.g., 2:00-3:00) is associated with increasing resource allocation amount.

In one embodiment the first set of conditions include three conditions. The first condition includes applying a reactive resource allocation value (e.g., r(n)) if the reactive resource allocation value is determined after a time (e.g., t(n)') when a corresponding and/or last proactive resource allocation value is applied and prior to a time (e.g., t(n+1)) when the corresponding proactive resource allocation value is adjusted. This refers to a window of time (e.g., the above-stated 10 minutes) between when a proactive resource allocation value is applied and when the proactive resource allocation value is adjusted. This may be represented as $t(n)' < r(n) < t(n+1)$. The second condition includes applying a reactive resource allocation value (e.g., r(n−1)) if the reactive resource allocation value is determined after a time (e.g., t(n)) when a last proactive resource allocation value is adjusted and prior to a time (e.g., t(n)') when a next proactive resource allocation value is applied. This may be represented as $t(n) < r(n-1)' < t(n)'$. The third condition is if the first condition and the second condition are not met, then the reactive resource allocation value is discarded.

The second set of rules include applying a resource allocation value if (i) one of the first condition and the second condition are true, and (ii) the reactive resource allocation value is associated with increasing the resource allocation amount. This is independent of whether the reactive resource allocation value is determined (i) between when a last proactive resource allocation value is applied and when the last proactive resource allocation value is adjusted, or (ii) after a time when the last proactive resource allocation value is adjusted and prior to a time when a next proactive resource allocation value is applied.

The second set of rules include applying a resource allocation value if (i) one of the first condition and the second condition are true, and (ii) the reactive resource allocation value is associated with increasing the resource allocation amount. The second set of rules includes discarding the reactive resource allocation value if the reactive resource allocation value is associated with decreasing the resource allocation amount. The second set of rules also includes applying the reactive resource allocation value if the resource allocation value is not an initial resource allocation value and is conservative (i.e. less than a predetermined amount).

Figure 8:
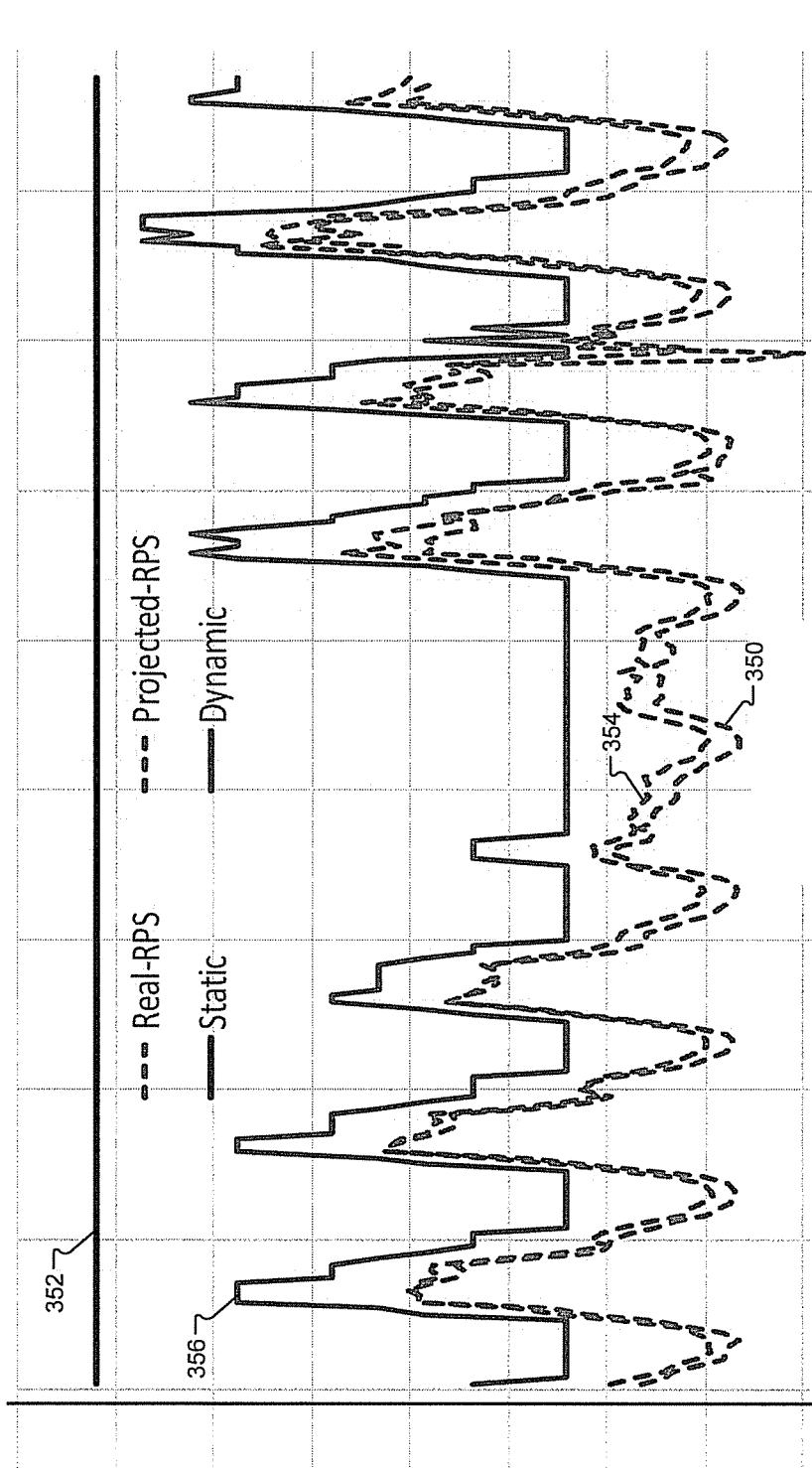
FIG. 8 is a graph illustrating an example of failover amortization in accordance with an embodiment of the present disclosure.

FIG. 8 shows a graph illustrating an example of failover amortization. The graph includes a resource allocation curve 370 for a first country and a second resource allocation curve 372 for a second country. Failover amortization for this example may include allocating (X+aY) VMs for the first country, where: X is a proactive or reactive resource allocation value determined while performing at least the operations 224 and 228 of FIG. 6 for the first country; a is a predetermined weight; and Y is the proactive and reactive resource allocation value determined while performing at least the operations 224 and 226 of FIG. 6 for the second country. The number of VMs allocated for the second country may be (Y+bX) VMs, where b is a predetermined weight. As an example, a and b may be equal to 0.5. Different failover amounts and weights may be provided depending on the number of entities and/or regions of concern (e.g., the number of data centers, countries, geographical regions, etc.) to provide an efficient distribution of resources. The failover amounts and weights may be based on distances between data centers and geographical regions. Higher weight values may be provided for data centers that are closer to a data center of concern experiencing issues than for data centers further away from the data center of concern.

Figure 9:
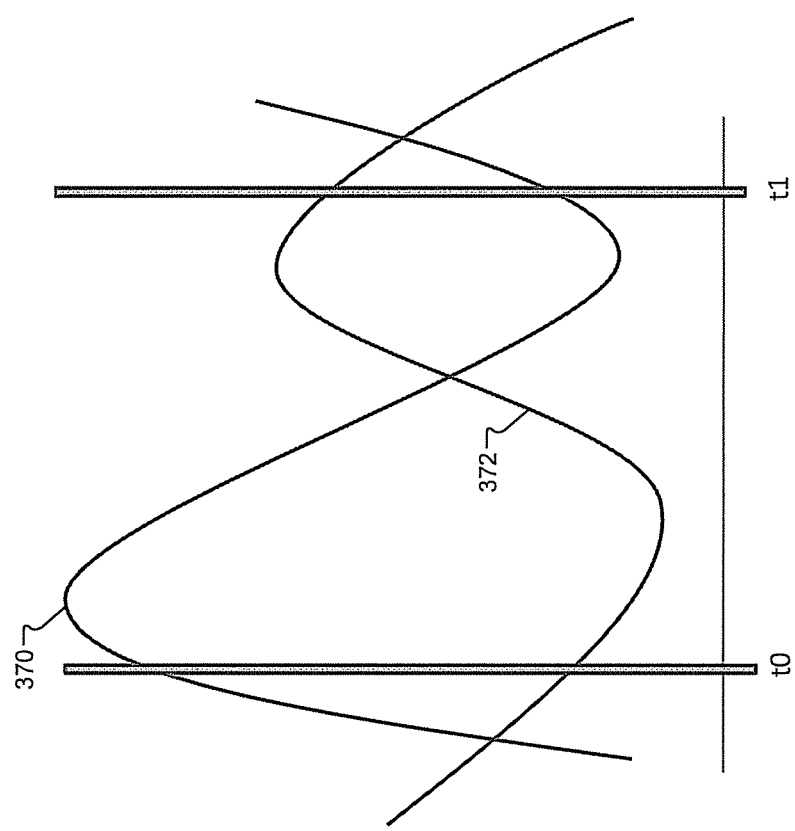
FIG. 9 is a graph illustrating an example of loading and resource allocation over time in accordance with an embodiment of the present disclosure.

FIG. 9 shows a graph illustrating an example of loading and resource allocation over time. FIG. 9 shows an example traditional resource allocation curve 352, an example projected request per second curve 354, an example actual request per second curve 356, and an example resource allocation curve 358 provided by implementing the methods of FIGS. 5-6 including at least the operations 224 and 228 of FIG. 6. The traditional resource allocation curve 352 provides a fixed resource allocation amount that is overloaded to account for potential issues with VMs and/or nearby data centers. The projected request per second curve 354 provides an example of the values provided using above equation 1. The actual request per second curve 356 refers to an actual amount of requests per second for the same period of time as that for curves 352, 354 and 358. As can be seen by the resource allocation curve 358, the described methods provide resource allocation amounts that follow and are greater than the actual load. By providing resource allocation amounts that are greater than the actual load, latency is minimized. The resource allocation amounts are less than the amount represented by the traditional resource allocation curve 352. The amount of resources saved using the described methods, for this example, is a difference between the traditional resource allocation curve 352 and the resource allocation curve 358.

Figure 10:
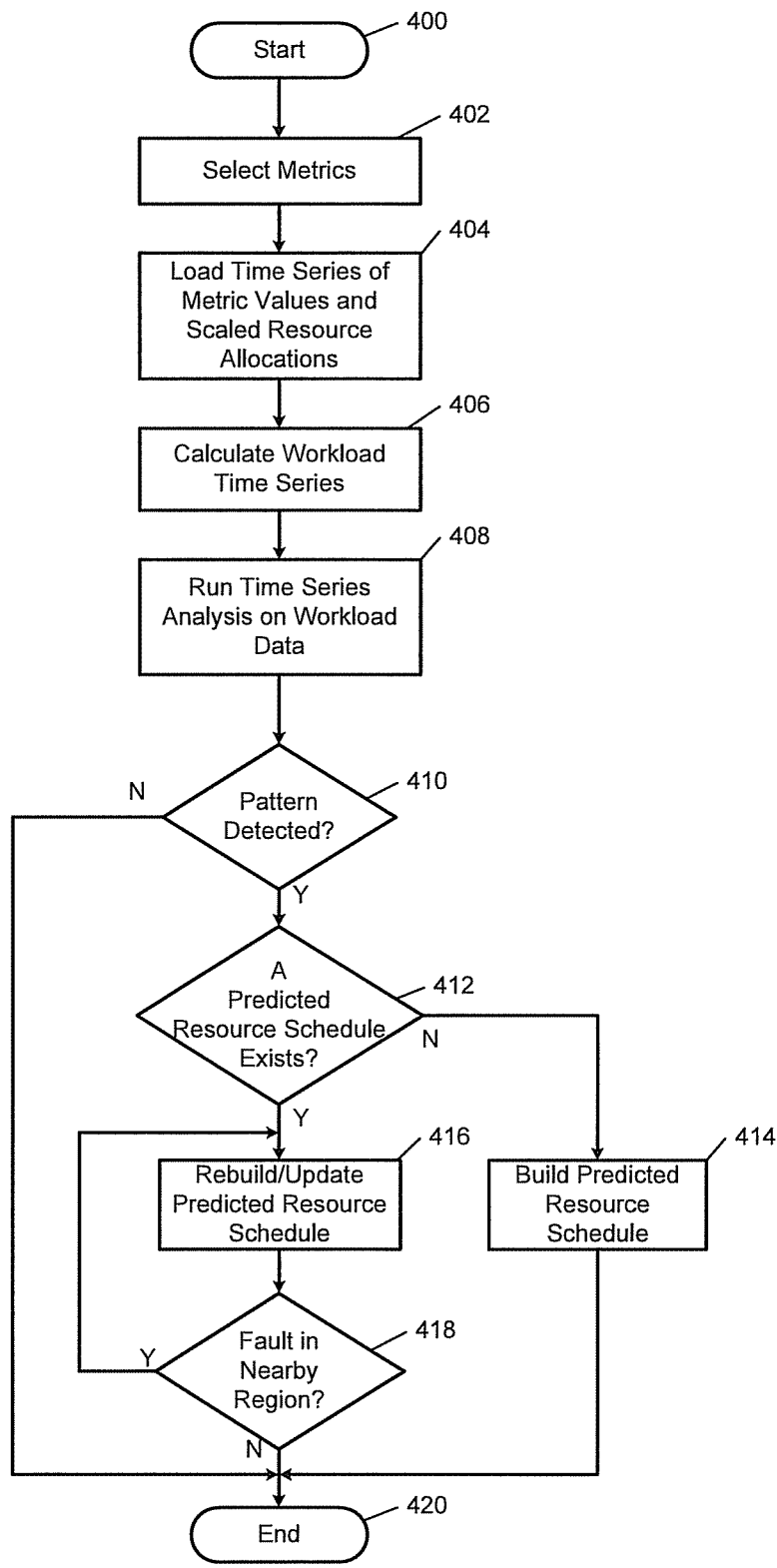
FIG. 10 illustrates an example predicted schedule generation method in accordance with an embodiment of the present disclosure.

FIG. 10 shows an example predicted schedule generation method, which may be performed by the predictive scheduling processor 88 of FIG. 2. The method may begin at 400. At 402, metrics are selected. At 404, a time series of metric values and scaled resource allocation values are loaded. This may include loading metric values from the forecasting server computer 82 and/or telemetry sensing processors 80. The metric values may include forecasted values and non-forecasted values.

At 406, a workload time series is calculated based on the metric values and the scaled resource allocation values. This may refer to a number of resources (e.g., number of instances of a resource) used per period of time. As an example, this may include a time series of values for a number of requests per second.

At 408, a time series analysis on the workload data is performed. This may include performing pattern detection to detect periodic patterns, trends, isolated workload instances, and/or seasonal components in the corresponding data. The time series analysis may be rule based.

At 410, the predictive scheduling processor 88 determines if a pattern has been detected. If a pattern has been detected, operation 412 is performed, otherwise the method may end at 420.

At 412, the predictive scheduling processor 88 determines whether a predicted resource schedule exists (i.e. has been previously generated). If a predicted resource schedule does not exist, operation 414 is performed, otherwise operation 416 is performed.

At 414, the predictive scheduling processor 88 generates the predicted resource schedule. The predicted resource schedule is a time-based schedule that includes predicted resource allocation amounts for predetermined time periods. The predicted resource schedule may include predicted resource allocation amounts for each data center and/or geographical region associated with a particular service. The predicted resource allocation amounts may be determined based on the expected workload for the stated predetermined time periods. The predicted resource allocation amounts are determined based on the detected patterns and may account for times of peak workloads. As a first example, the predicted resource allocation amounts may be determined using a Holt-Winters time series forecasting algorithm including triple exponential smoothing. This may include exponentially weighing moving averages. As another example, the predicted resource allocation amounts may be determined using a Box-Jenkins analysis including identifying, fitting, and checking values and using ARIMA time series models. The method may end at 420 subsequent to performing operation 414.

At 416, predictive scheduling processor 88 rebuilds or updates the predicted resource schedule. Rebuilding the predicted resource schedule may include building a new predicted resource schedule in a similar manner as described above with respect to operation 414. Values in the existing predicted resource schedule may be updated based on updated workload values and patterns detected by performing another iteration of operations 402-412.

At 418, predictive scheduling processor 88 determines if a fault has occurred in, for example, a nearby geographical region. This may be indicated to the predictive scheduling processor 88 by the fault processor 99. If a fault has been detected, operation 416 may be rerun to actualize the predicted schedule in order to accommodate additional anticipated workload, otherwise the method may end at 420.

Figure 11:
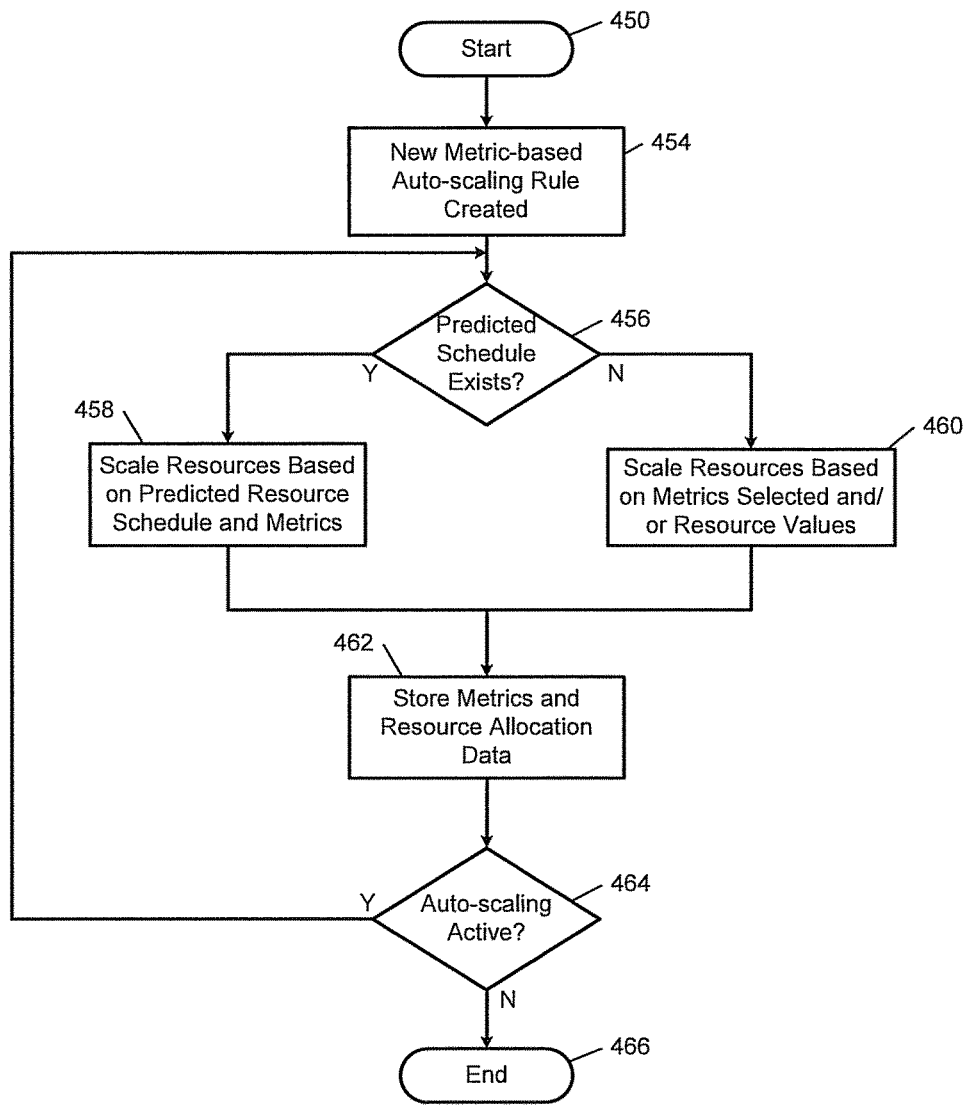
FIG. 11 illustrates an example scaling method in accordance with an embodiment of the present disclosure.

FIG. 11 shows an example scaling method, which may be performed by the mapping and scaling processor 98 of FIG. 2. The method may begin at 450. At 454, one or more new metric based auto-scaling rules are created. The auto-scaling rules may be used during operation 240 of FIG. 6 to scale up or down allocated resources. The auto-scaling rules indicate when to increase, maintain and decrease resource allocation amounts.

At 456, the mapping and scaling processor 98 determines whether a predicted schedule exists. If a predicted resource schedule exists, operation 458 is performed, otherwise operation 460 is performed. At 458, resources are scaled based on the predicted resource schedule and optionally based on values for the metrics (e.g., the metrics selected at 402 of FIG. 10). The scaling may also be performed based on auto-scaling rules, such as the auto-scaling rules created at 454. The auto-scaling may additionally or alternatively be based on the resource values determined during operations 224, 228, 230, 232, 234 of FIG. 6.

At 460, the mapping and scaling processor 98 auto-scales resources based on the metrics selected and corresponding metric values. The auto-scaling may additionally or alternatively be based on the resource values determined during operations 224, 228, 230, 232, 234 of FIG. 6.

At 462, the mapping and scaling processor 98 stores the metrics, metric values, and resource allocation data. The resource allocation data indicates the latest set scaling values and/or corresponding resource allocation amounts.

At 464, the mapping and scaling processor 98 determines whether auto-scaling is active. If the auto-scaling is active, operation 456 is performed, otherwise the method may end at 466.

The above-described methods of FIGS. 5-6 and 10-11 provide dual proactive and reactive scaling. The corresponding system architectures are modular, flexible, and pluggable. The proactive and reactive scaling is performed to provide a variable amount of resources (e.g., a variable number of VMs) per resource allocation service, per service provider service, per data center, per geographical region, etc. Any number of telemetry sensing processors (or sensors) can be added and removed. Also, any number of functors may be added and/or removed, while allowing for both proactive and reactive scaling to be performed. Each of the sensing applications of the telemetry sensing processors and the functors may be implemented as an independent and pluggable module. Each of the sensor applications is used to perceive a service state.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

A processor may refer to a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The processor may include one or more interface circuits. In some examples, the interface circuits may include wired or wireless interfaces that are connected to a local area network (LAN), the Internet, a wide area network (WAN), or combinations thereof. The functionality of any given processor of the present disclosure may be distributed among multiple circuits that are connected via interface circuits. For example, multiple circuits may allow load balancing.

The term code, as used above, may include software, firmware, and/or microcode, and may refer to programs, routines, functions, classes, data structures, and/or objects. The term shared processor circuit encompasses a single processor circuit that executes some or all code from multiple circuits. The term group processor circuit encompasses a processor circuit that, in combination with additional processor circuits, executes some or all code from one or more circuits. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple circuits. The term group memory circuit encompasses a memory circuit that, in combination with additional memories, stores some or all code from one or more circuits.

The term memory or memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element; such as by encode instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (JSON), hypertext markup language (HTML) or extensible markup language (XML), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A resource allocation system comprising:
at least one processor;
at least one memory; and
one or more applications stored in the at least one memory and including instructions, which are executable by the at least one processor and are configured to:
receive forecast data from a forecast server computer, wherein the forecast data indicates a predicted metric value corresponding to a cloud-based service for a first geographical region,
determine an expected usage amount for the first geographical region based on the predicted metric value,
determine a failover resource amount to cover at least a portion of a load in a second geographical region due to a failure in the second geographical region, wherein the expected usage amount does not include the failover resource amount and the failover resource amount does not include the expected usage amount,
determine a first predicted resource allocation value based on the expected usage amount and the failover resource amount, determine a first reactive resource allocation value based on at least one of the predicted metric value or a parameter, wherein the parameter corresponds to access of cloud-based resources for the cloud-based service,
prioritize the first predicted resource allocation value and the first reactive resource allocation value by at least selecting one of the first predicted resource allocation value or the first reactive resource allocation value, and
adjust a resource allocation amount for the first geographical region over time based on a result of the prioritization.

2. The resource allocation system of claim 1, wherein:
the instructions are further configured to determine the expected usage amount for the first geographical region based on a test metric value and a confidence level;
the test metric value is based on load testing; and
the confidence level indicates a percentage of the test metric value.

3. The resource allocation system of claim 1, wherein:
the instructions are further configured to determine the expected usage amount for the first geographical region based on an overload value; and
the overload value accounts for resource deployments or updates.

4. The resource allocation system of claim 1, the instructions are further configured to determine the expected usage amount based on a plurality of performance count values.

5. The resource allocation system of claim 1, the instructions are further configured to:
receive a signal from a sensing application, wherein the signal indicates that data has been received and parsed via a plurality of sensing applications for a plurality of virtual machines, stored in a database and is available for access; and
in response to the signal,
determine the expected usage amount for the first geographical region, and
determine the first reactive resource allocation value.

6. The resource allocation system of claim 1, wherein:
the instructions include a plurality of sets of code;
the plurality of sets of code refer respectively to functors including:
a first functor for determining the first predicted resource allocation value,
a second functor for determining the first reactive resource allocation value, and
a third functor for determining another resource allocation value; and
the third functor performs at least one of a proactive determination of an amount of resources to allocate or reactive determination of an amount of resources to allocate.

7. The resource allocation system of claim 6, the instructions are further configured to:
prioritize the another resource allocation value provided by the third functor along with the first predicted resource allocation value and the first reactive resource allocation value; and
adjust the resource allocation amount for the first geographical region over time based on a result of the prioritization.

8. The resource allocation system of claim 1, wherein the instructions are further configured to:

determine a plurality of proactive resource allocation values including a first proactive resource allocation value;

determine a plurality of reactive resource allocation values including the first reactive resource allocation value;

prioritize the plurality of proactive resource allocation values based on a first set of rules; and prioritize the plurality of reactive resource allocation values based on a set of conditions and a second set of rules.

9. The resource allocation system of claim 8, wherein the instructions are configured to alternate between applying one of the plurality of proactive resource allocation values and applying one of the plurality of reactive resource allocation values.

10. The resource allocation system of claim 1, wherein the instructions are further configured to:

determine a predicted schedule of resource allocation values; and prioritize the resource allocation values of the predicted schedule along with the first predicted resource allocation value and the first reactive resource allocation value.

11. The resource allocation system of claim 1, wherein:

load a time series of metric values and scaled resource allocation values corresponding to providing the cloud-based service for the first geographical region, calculate a workload time series based on the time series of metric values and the scaled resource allocation values, analyze the workload time series to detect at least one of a pattern of workloads or isolated workloads, wherein a workload refers to an amount of resource allocation, based on the detected pattern, generate a predicted schedule of resource allocation amounts for future predetermined periods of time, wherein the resource allocation amounts of the predicted schedule are for the cloud-based service and are determined according to a forecasting algorithm or an autoregressive integrated moving average, and allocate cloud-based resources based on the predicted schedule.

12. A resource allocation system comprising:

at least one processor;

at least one memory; and one or more applications stored in the at least one memory and including instructions, which are executable by the at least one processor and are configured to:

receive forecast data from a forecast server computer including a plurality of performance count values, wherein the forecast data indicates predicted metric data corresponding to a cloud-based service for a first geographical region, determine an expected usage amount for the first geographical region based on the forecast data, a confidence value, and an overload value, determine a failover resource amount to cover a failure in a second geographical region, wherein the expected usage amount does not include the failover resource amount and the failover resource amount does not include the expected usage amount, determine a first resource allocation value based on the expected usage amount and the failover resource amount, determine a second resource allocation value based on the plurality of performance count values, prioritize the first resource allocation value and the second resource allocation value by at least selecting one of the first resource allocation value or the second resource allocation value based at least in part on timing conditions, and adjust a resource allocation amount for the first geographical region based on a result of the prioritization.

13. The resource allocation system of claim 12, wherein:

one of the plurality of performance count values is a number of requests per second;

the first resource allocation value is a proactive resource allocation value; and the second resource allocation value is a reactive resource allocation value.

14. The resource allocation system of claim 12, wherein:

the overload value accounts for unavailable resources due to deployments or updates;

the confidence value indicates a percentage of a test metric value;

the test metric value is based on load testing; and the failover resource amount is based on an estimated amount of additional traffic to a first data center due to a failure of a second data center.

15. The resource allocation system of claim 14, wherein:

the first data center is in the first geographical region; and the second data center is in the second geographical region.

16. The resource allocation system of claim 12, wherein the instructions comprise:

a first portion configured to determine the first resource allocation value;

a second portion configured to determine the second resource allocation value;

a third portion configured to generate a predicted schedule of resource allocation amounts; and a fourth portion configured to generate a resource allocation value corresponding to a detected pattern of usage.

17. The resource allocation system of claim 12, wherein:

load a time series of metric values and scaled resource allocation values corresponding to providing the cloud-based service for the first geographical region, calculate a workload time series based on the time series of metric values and the scaled resource allocation values, analyze the workload time series to detect at least one of a pattern of workloads or isolated workloads, wherein a workload refers to an amount of resource allocation, based on the detected pattern, generate a predicted schedule of resource allocation amounts for future predetermined periods of time, wherein the resource allocation amounts of the predicted schedule are for the cloud-based service and are determined according to a forecasting algorithm or an autoregressive integrated moving average, and allocate cloud-based resources based on the predicted schedule.

18. A resource allocation system comprising:

at least one processor;

at least one memory; and one or more applications stored in the at least one memory and including instructions, which are executable by the at least one processor and are configured to:

load a time series of metric values and scaled resource allocation values corresponding to providing a cloud-based service for a first geographical region, calculate a workload time series based on the time series of metric values and the scaled resource allocation values, analyze the workload time series to detect a pattern of workloads, wherein a workload refers to an amount of resource allocation, based on the detected pattern of workloads, generate a predicted schedule of resource allocation amounts for future predetermined periods of time for the first geographical region, wherein the resource allocation amounts of the predicted schedule are for the cloud-based service and are determined according to a forecasting algorithm or an autoregressive integrated moving average, allocate cloud-based resources based on the predicted schedule, detect a fault in a second geographical region, adjust the predicted schedule for the first geographical region to accommodate additional anticipated workload as a result of the fault in the second geographical region, and reallocate the cloud-based resources based on the adjusted predicted schedule.

19. The resource allocation system of claim 18, wherein the forecasting algorithm is a Holt-Winters time series forecasting algorithm including triple exponential smoothing.

20. The resource allocation system of claim 18, wherein the resource allocation amounts are determined using a Box Jenkins analysis including autoregressive integrated moving average time series models.

21. The resource allocation system of claim 18, wherein the instructions are further configured to:

selecting metrics, wherein the metric values are loaded based on the selected metrics;

determining whether the predicted schedule is generated; and based on whether the predicted schedule is generated, allocating resources based on at least one of the selected metrics and the predicted schedule.

22. The resource allocation system of claim 18, wherein the instructions are further configured to regenerate and/or modify the predicted schedule based on a newly detected pattern or newly selected metrics.

* * * * *